(12) United States Patent
Porte et al.

(10) Patent No.: US 6,536,556 B2
(45) Date of Patent: Mar. 25, 2003

(54) NOISE REDUCTION SANDWICH PANEL, NOTABLY FOR AIRCRAFT TURBOJET ENGINE

(75) Inventors: Alain Porte, Colomiers (FR); Hervé Batard, Tournefeuille (FR)

(73) Assignee: Airbus France, Toulouse Cedex (FR)

( * ) Notice: Subject to any disclaimer, the term of this patent is extended or adjusted under 35 U.S.C. 154(b) by 0 days.

(21) Appl. No.: 09/977,949

(22) Filed: Oct. 17, 2001

(65) Prior Publication Data

US 2002/0050420 A1 May 2, 2002

(30) Foreign Application Priority Data

Oct. 31, 2000 (FR) ............................................. 00 13977

(51) Int. Cl.[7] ................................................. E04B 1/82
(52) U.S. Cl. ....................... 181/292; 181/284; 181/286; 181/291
(58) Field of Search ................................ 181/292, 284, 181/286, 291

(56) References Cited

U.S. PATENT DOCUMENTS

| 3,905,443 A | * | 9/1975 | Sieuzac | ........................ | 181/291 |
|---|---|---|---|---|---|
| 4,667,768 A | * | 5/1987 | Wirt | ............................ | 181/286 |
| 5,997,985 A | * | 12/1999 | Clarke et al. | ................ | 428/116 |

FOREIGN PATENT DOCUMENTS

| EP | 0976883 | | 2/2000 |
|---|---|---|---|
| FR | 2792757 | | 10/2000 |
| GB | 1 463 918 | | 2/1975 |
| GB | 2 098 926 A | | 5/1981 |
| GB | 2 252 076 A | | 7/1992 |
| JP | 05046180 | * | 2/1993 |

* cited by examiner

*Primary Examiner*—Shih-yung Hsieh
(74) *Attorney, Agent, or Firm*—Thelen Reid & Priest LLP; Robert E. Krebs (57) ABSTRACT

Noise reduction sandwich panel, notably for an aircraft turbojet engine.

In order to produce a noise reduction sandwich panel having a structure with two degrees of freedom, inserted separative components (20) are placed into the hexagonal cells (16) of the unique waffle core of the panel. More specifically, the separative components (20) have an substantially circular external peripheral edge, which allows them to be easily assembled, in spite of the deformations of the walls (18) of the cells (16) due to manufacturing tolerances and to the optional forming of the waffle core. Advantageously, several separative components (20) are supported by a same positioning unit (22), which then allows relative displacement between the separative components.

12 Claims, 7 Drawing Sheets

NOISE REDUCTION SANDWICH PANEL, NOTABLY FOR AIRCRAFT TURBOJET ENGINE

This application claims priority under 35 U.S.C. §§119 and/or 365 to 00 13977 filed in France on Oct. 31, 2000; the entire content of which is hereby incorporated by reference.

TECHNICAL FIELD

The invention relates to a noise reduction sandwich panel of the type including a waffle core mounted between a porous resistive layer and a reflector.

Such a sandwich panel may advantageously be used in an aircraft turbojet engine, for example in order to form the internal wall of the air intake and of the thrust reverser.

STATE OF THE ART

In aircraft turbojet engines developed during the last couple of years, noise reduction is one of the priority goals. Indeed, present regulations relative to noise level around airports impose a threshold not to be exceeded. Beyond this threshold, airlines are under obligation to pay financial penalties to the airport authorities.

Figure 1:
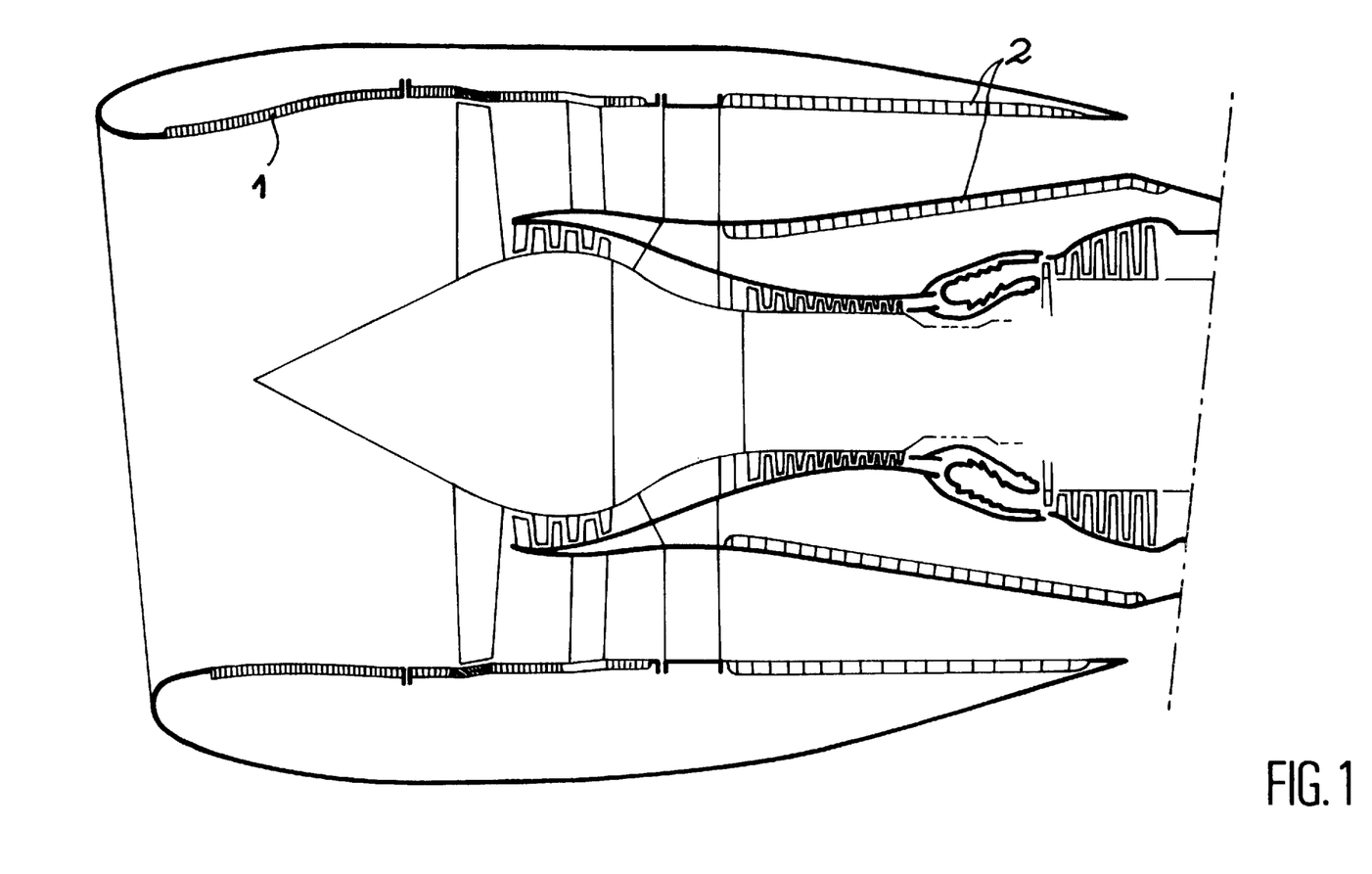
FIG. 1, already described, is a schematic sectional view illustrating the implantation areas of the noise reduction sandwich panels in an aircraft turbojet engine.

For this purpose and as FIG. 1 of the appended drawings illustrates this in a sectional view and very schematically, it is common practice to produce the major portion of the inner wall 1 of the air intake of a turbojet engine, as well as the walls 2 of the thrust reverser as noise reduction sandwich panels.

These noise reduction sandwich panels comprise, from the surface of the panel turned towards the outside, a more or less air permeable resistive layer, a waffle core most frequently having a structure of the honeycomb type, and a rear total reflector.

In this conventional layout of noise reduction sandwich panels, the resistive layer has a dissipate role. When a sound wave crosses it, viscous effects are produced which transform acoustical energy into heat.

The height of the waffle core enables the panel to be tuned to the characteristic frequency of the noise to be damped. Dissipation of noise in the resistive layer is maximum when the height of the cells of the waffle core is equal to a quarter of the wavelength of the noise frequency to be damped. The cells of the waffle structure then behave as waveguides perpendicular to the surface of the panel, which give them a response of the "localized reaction" type. The cells form an assembly of quarter wave resonators in parallel.

The rear reflector produces total reflection conditions absolutely required for obtaining the behavior described above of the waffle core.

A noise reduction sandwich panel implanted in an aircraft turbojet engine should meet various requirements of an acoustical, mechanical, structural and aerodynamically nature. For fulfilling the noise reduction function, there are presently different types of sandwich panels.

In the so-called "non-linear one-degree-of-freedom" panels, the resistive layer consists of a metal or composite perforated layer. This structure has the advantage of providing good control of the percentage of open surface, of exhibiting good structural strength and of being easy to produce. However, it exhibits a strong acoustical non-linearity as well as a strong dependence of the strength on the surface tangential flow velocity. Further, as the frequency damped by each cell depends on its depth and as all the cells of the panel have the same depth, the range of frequencies damped by such a structure is limited. In addition, as the resistive layer is in a composite material, the structure has low erosion resistance.

So-called "linear one-degree-of-freedom" noise reduction sandwich panels are also known. In this case, the resistive layer is a microporous layer for example consisting of metal fabric, of perforated sheet metal associated with an acoustical fabric or of a metal fabric associated with an acoustical fabric. Such a structure enables the acoustical resistance to be adjusted by changing the components of the microporous layer. Its effective frequency range is reasonable. It has a low to moderate non-linearity as well as a low dependency of the acoustical resistance on the surface tangential flow velocity.

However, the production of a linear one-degree-of-freedom sandwich panel is more complicated than that of non-linear one-degree-of-freedom panel, because the resistive layer comprises two constituents. If the components or the assembly methods are not under control, the structure may have areas of acoustical non-homogeneity and there are also risks of delamination of the resistive layer. Further, risks of corrosion of the resistive layer impose an additional constraint as to the choice of the materials used. Finally, the assembly method of such a panel is lengthy and costly.

"Two-degrees-of-freedom" noise reduction sandwich panels are also known. Such a panel comprises, in addition to a perforated resistive layer and a rear reflector, two superimposed waffle cores, separated by an intermediate resistive layer called a "septum", which is generally microporous.

As compared with other types of sandwich panels, the panels with two degrees of freedom have a larger range of damped frequencies, a possibility of adjusting the acoustical resistance by means of both resistive layers, and a low to moderate acoustical non-linearity. However, areas of acoustical non-homogeneity appear because of misalignment of the cells from both waffle cores which inevitably occurs upon forming the panel. There are also parasitic transverse propagation phenomena in the areas where the cells of both waffle cores are not aligned. Finally, the assembly method for a panel of this type is lengthy and costly, as the different components of the structure must be assembled one by one.

Various solutions have been suggested in order to overcome the drawbacks of the two-degrees-of-freedom panels resulting from misalignments of cells from both waffle cores.

Thus, in document GB-A-2,252,076, a sandwich panel with two degrees of freedom is obtained from a waffle core produced as a single piece. The intermediate resistive layer is obtained by positioning a separation sheet on one face of this core and by pressing down on the sheet in such a way that it is cut out into pieces having the dimensions of the cells, by the edges of the walls of the latter. These pieces are then pushed in and then stuck in the cells in a predetermined position. However, the problem of accurately placing the different pieces, repeatedly and reliably, is not solved in this document.

Document GB-A-2,098,926 describes a method for integrating a separation sheet into a sandwich panel comparable to the one described in document GB-A-2,252,076. More specifically, this document suggests the use of a press for cutting out the separation sheet to the dimension of the cells by means of the waffle core. As soon as this operation is completed, the waffle core incorporating the pieces cut out of the separation sheet is placed in a bath of dense liquid, the depth of which is carefully monitored in order to push these pieces into their predetermined definitive position. With this technique a two-degrees-of-freedom sandwich panel may be obtained, wherein the cells are aligned properly. However, this method is relatively lengthy and delicate to implement and may prove to be dangerous because of the use of a liquid such as mercury. Further, it is completely unsuitable in the case of a non-planar sandwich panel.

In document GB-A-1,463,918, a two-degrees-of-freedom sandwich panel is obtained by using a single waffle core, the cells of which are divided, in the direction of height, into two subcells by separative components mounted in each cell. In all the described solutions, the separative components have the same hexagonal shape and the same dimensions as the cells in which they are received.

Further, among the various solutions proposed in document GB-A-1,463,918, certain propose joining up several separative components received in aligned cells. These solutions seem advantageous from an industrial point of view, as they lead to a reduction of the setup time for the separative components, which is all the more significant as the number of cells of a sandwich panel is generally very large. More specifically, according to document GB-A-1,463,918, the adjacent separative components are joined up either by a ply which overlaps the upper edge of the partition separating the cells, or directly by an edge-to-edge joining of the separative components, crossing a machined notch in the upper half of the partition, so that its upper edge is at the same level as the separative components.

However, the implementation of the various techniques described in document GB-A-1,463,918, practically gives rise to practically insurmountable difficulties.

Indeed, the implementation of the separative components described in this document would be practically impossible because of the variations in the sizes and shapes of the cells which inevitably occur on a sandwich panel of a large dimension and of a non-planar shape. Thus, taking the small size of the cells into account, their partitions are relatively stiff and practically do not allow the differences in shapes and sizes to be compensated upon the placing of the described separative components, the shape and dimensions of which are the same as those of the cells. This phenomenon is more pronounced when several separative components are joined up to each other. Indeed, the proposed solutions in document GB-A-1,463,918, do not allow the distance between the neighboring separative components to be varied, to take into account the manufacturing tolerances of the honeycomb structure.

Moreover, in the embodiment according to which two separative components placed in two neighboring cells are directly joined together through their adjacent edges and are supported on the upper edge of a notch cut out in the partition separating these cells, the repeated cutting out of this partition on the whole of the panel lowers the mechanical strength of the latter in such an unacceptable way.

DESCRIPTION OF THE INVENTION

The object of the invention is specifically a noise reduction sandwich panel having a structure of the two-degree-of-freedom type integrating inserted separative components designed so that they may be easily mounted, on an industrial scale, into the cells of a unique waffle core, however without causing a reduction in the mechanical strength of the panel or a lowering of its acoustical properties.

According to the invention, this result is obtained by means of a noise reduction sandwich panel, comprising:
- a resistive layer;
- a reflector;
- a unique waffle core, in a single piece, placed between the resistive layer and the reflector, and forming a plurality of juxtaposed cells separated by partitions;
- inserted separative components in the cells in order to divide the latter, in the direction of height, into at least two subcells;
- characterized in that each separative component has a substantially circular external peripheral edge and in that said panel further comprises positioning units for positioning the separative components within the cells, said positioning units being secured to the separative components and being supported on the edges of the partitions adjacent to the reflector or to the resistive layer.

In a thereby formed sandwich panel, the separative components provide the structure with a layout of the two-degrees-of-freedom type, by the circular shape of the contour of the separative components, the mounting of these components into the cells, generally with a hexagonal section, may be achieved without any particular difficulty, in spite of the differences in shapes and sizes of the cells resulting from the honeycomb structure manufacturing techniques and from the optional non-planarity of the panel.

According to a preferred embodiment of the invention, the external peripheral edge of each separative component has a diameter substantially equal to the distance separating two opposite partitions of a cell. The expression "substantially equal" notably takes into account the inaccurateness of the distance between the partitions, resulting from the manufacturing tolerances.

Advantageously, the separative components have the shape of substantially planar disks. The external peripheral of each of the separative components may then be raised towards the reflectors or towards the resistive layer, to further facilitate the mounting.

According to a first embodiment of the invention, each positioning unit then supports only one separative component.

Each positioning unit may then comprise a small plate, placed between the separative component which it supports and the reflector or the resistive layer, substantially perpendicularly to the latter, said small plate comprising two protruding portions, adjacent to the reflector or to the resistive layer, which are supported in the notches formed in the edges adjacent to the reflector and to the resistive layer of both opposite partitions of the corresponding cells.

Alternatively, each positioning unit may also comprise at least two tabs which extend between the separative component which they support and the reflector or the resistive layer, each tab comprising an end folded between the waffle core and the reflector or the resistive layer.

In this case, advantageously, at least one of the tabs completely crosses a cell adjacent to the one which contains the separative component supported by this tab.

According to a second embodiment of the invention, each positioning unit supports several separative components, inserted in aligned cells along a given direction, and integrates, between each pair of consecutive separative components which it supports, at least one tab able to deform along said direction. With this layout, the separative components may be placed easily and quickly, in spite of the possible variations in the pitch of the aligned cells resulting from manufacturing tolerances and from the optional non-planarity of the panel.

In this embodiment, the separative components supported by a same position unit, are advantageously placed in every other cell, in the direction of the alignment of the cells.

In this case, each positioning unit may comprise small plates, each of which is placed between the reflector and the resistive layer and one of the separative components supported by this positioning unit, perpendicularly to the reflector or to the resistive layer. A tab then joins up each pair of consecutive small plates, overhanging a cell which does not contain any separative component supported by said positioning unit. Further, the tab is bent with respect to the direction of alignment of the cells, in order to be able to deform along this direction.

Each positioning unit may also comprise tabs which join up the consecutive separative components and a straight section of which overhangs the cell which does not contain any separative component supported by this positioning unit. The straight section then has a length greater than the distance separating two opposite partitions of the cell, in order to allow for deformation of both bent sections of the tab, joining up the straight section to the separative components contained in the neighboring cells.

According to an alternative of the second embodiment of the invention, the separative components supported by a same positioning unit are placed in adjacent cells, in the direction of alignment of the cells. Each positioning unit then comprises tabs, a straight section of which overlaps the partition separating the adjacent cells, on the reflector or resistive layer side, in order to extend on both sides of said partitions. In this case, two bent sections of each tab join up the straight section to the separative components contained in the adjacent cells.

BRIEF DESCRIPTION OF THE DRAWINGS

Different embodiments of the invention will now be described as non-limiting examples, with reference to the appended drawings, wherein.

DETAILED DESCRIPTION OF THE PREFERRED EMBODIMENT OF THE INVENTION

Figure 2:
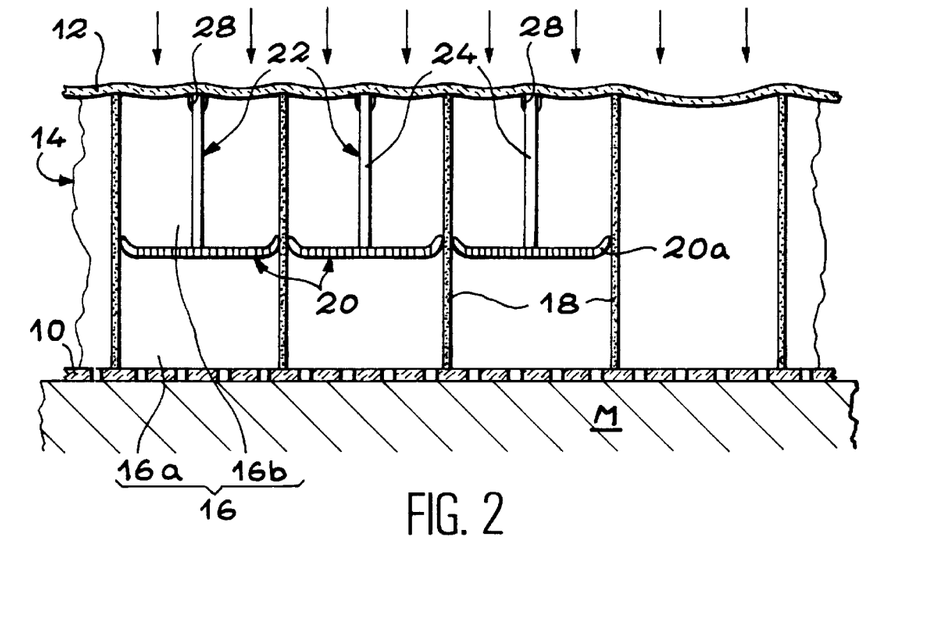
FIG. 2 is a transverse sectional view illustrating a first embodiment of a noise detection sandwich panel according to the invention.

As illustrated in FIG. 2, a noise reduction sandwich panel according to the invention notably comprises a porous resistive layer 10, a reflector 12 and a single waffle core 14, formed as a single piece.

The porous resistive layer 10 is for forming the external skin of the panel. In other words, it is provided in order to be turned towards the outside of the structure in which the panel should be integrated. Thus, when the sandwich panel is integrated onto the internal face of the air intake or onto the walls of the thrust reverser of an aircraft turbojet engine, as illustrated in FIG. 1, the porous resistive layer 10 is turned to the side of the aerodynamic jet which flows in the fan duct of the turbojet engine.

The resistive layer 10 is porous and cut out or perforated. It may be in metal or composite. When the resistive layer 10 is crossed by an acoustic wave, viscous effects occur which transform the acoustic energy into heat and thus provide dissipation of this acoustic energy.

The reflector 12 is placed on the face of the sandwich panel provided in order to be turned towards the inside of the structure in which this panel is integrated. For the acoustic waves which penetrate into the sandwich panel through the resistive layer 10, from the aerodynamic jet, the reflector 12 thus forms the rear face of the panel.

The reflector 12 is produced in a known way in order to provide total reflection of the acoustic waves which reach it. For this purpose, it has a continuous structure free of any perforation and porosity. It may be in metal or composite.

The unique waffle core 14 of the sandwich panel has a honeycomb type structure. This structure is characterized by a plurality of cells 16 of a hexagonal section, juxtaposed one onto the other according to a conventional layout, as illustrated by a top view in FIG. 3. Cells 16 are separated from one another by planar partitions 18, perpendicularly orientated to both faces of the waffle core 14, and therefore perpendicularly to the resistive layer 10 and to the reflector 12.

The waffle core 14 has cells 16, the section of which is advantageously larger than that of the cells of the waffle core used in the noise reduction sandwich panels implanted on aircraft turbojet engines today. Thus, whereas the cellular recesses of the existing panels usually have a width between about 6 mm and about 9 mm, the cells 16 of the panel 14 preferably have a width between about 10 mm and about 20 mm. In both cases, the width is measured between two facing partitions 18.

This increase in the size of the cellular recesses provides considerable reduction in the number of recesses contained in a panel of a given size. This also leads to an increase in the flexibility of the partitions 18 separating the cells. However, the proposed size for the cells 16 remains sufficiently small so as to maintain satisfactory mechanical and acoustic characteristics of the panel.

Moreover, it should be noted that noise reduction sandwich panels are not generally planar. On the contrary, as illustrated in FIG. 1 in the case of an aircraft turbojet engine, the external surface of these panels defined by the resistive layer generally has a curved, concave or convex shape. As a result, the geometry specific to a planar panel, as illustrated in FIG. 2, does not correspond to reality. In particular, the partitions 18 separating the cells 16 are not perfectly parallel to each other and their gap may vary according to whether they are near the resistive layer 10 or the reflector 12 or not. This irregular and imperfect character of the shape and of the dimensions of the cells 16 is increased by the manufacturing techniques used presently for the waffle core 14. Indeed, these manufacturing techniques result in relatively large variations in dimensions and shapes for the cells 16, when a panel of relatively large dimensions is produced.

According to the invention, the noise reduction sandwich panel further comprises separative components 20, placed in the cells 16 of the waffle core 14, in order to divide each of these cells, in the direction of height, i.e. perpendicularly to the faces of the panel, into at least two subcells 16a and 16b. Subcells 16a are defined, for example, between the separative components 20 and the resistive layer 10 whereas subcells 16b are defined between the separative components 20 and the reflector 12.

The separative components 20 are made in a metal or composite porous material, comparable to that in which is formed the resistive layer 10. They thus form a microporous intermediate resistive layer in each of the cells 16 of the panel. The action of this intermediate resistive layer combined with those of the front resistive layer 10, of the reflector 12 and of the cells 16 impart a behavior of the two-degree-of-freedom type to the structure of the panel.

Figure 3:
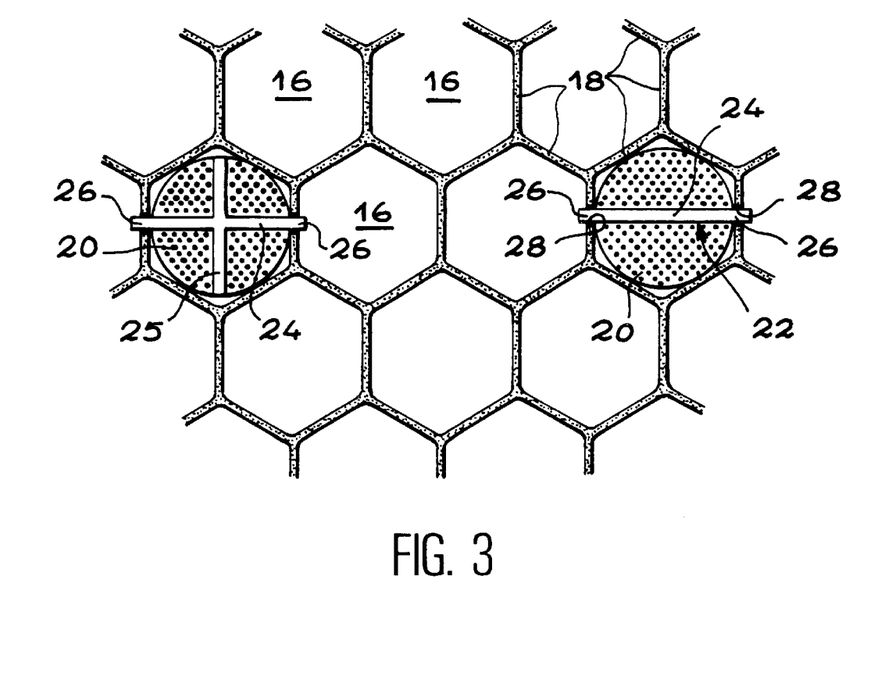
FIG. 3 is a top view of the sandwich panel of FIG. 2, illustrating the first embodiment of the invention, as well as an alternative of this embodiment.

According to the invention, and as notably illustrated in FIG. 3, the separative components 20 have a substantially circular external peripheral edge. More specifically, the diameter of the external peripheral edge of each separative component 20 is substantially equal to the width of the cells 16, i.e. to the distance which separates two facing walls 18 of a cell. Although other shapes are possible, such as domed or conical shapes, the separative components advantageously assume the shape of substantially planar disks.

With this layout, the separative components in the cells 16 may easily be placed, because the separative components do not closely fit the shape of the cells. Variations in this shape as well as in the dimensions of the cells, practically unavoidable on a panel of large dimensions, are thus without any consequences during the mounting of these components.

It should be noted that the difference in shape between the section of cells 16 and the periphery of the separative components 20 is expressed by a slight loss as regards the acoustic effect produced by these components. However, as this loss is proportional to the ratio of the surfaces, it is practically insignificant, notably when cells 16 of relatively large section are used as recommended.

The placing of the separative components 20 in the cells 16 is also facilitated by raising the peripheral edge 20a of each of these components towards the reflector 12, as notably illustrated in FIG. 2.

The noise reduction sandwich panel also comprises positioning units 22 used for supporting the separative components 20 and for providing their accurate positioning, in the direction of height, inside each of the cells 16. These positioning units 22 are preferably made in a practically transparent material from the acoustical point of view, such as metal foil of very small thickness (for example, 1/nth of a millimeter). Further, this metal foil is laid out in such a way that it is present in only one thickness and in a determined position.

The positioning units 22 are secured to the separative components 20 and they are designed in such a way that the two following characteristics are met simultaneously:
  the positioning units 22 are supported on the edges of the partition 18 adjacent to reflector 12; and
  the positioning units 22 form, for reflector 12, further supporting areas relative to the aforementioned edges of partitions 18.

The first of these characteristics, provides accurate control, both reliably and reproducibly, over the distance which separates each of these separative components 20 of the reflector 12, without impairing the mechanical characteristics of the panel. The acoustic behavior or the sandwich panel may thus be perfectly controlled whatever the shape given to this panel. Further, by maintaining the integrity of the partitions 18 separating the cells 16, this characteristic ensures that satisfactory mechanical properties are maintained.

With the second characteristic set forth above, a too large flexion of reflector 12 may be prevented between partitions 18, which may occur as illustrated in the right portion of FIG. 2, because of the use of a waffle core having cells 16 with relatively large dimensions. Indeed, such a sandwich panel is usually manufactured as schematically illustrated in FIG. 2, by placing the resistive layer 10 on a mold M, then by positioning the waffle core 14 on the resistive layer 10, and then by placing in the cells 16, separative components 20 borne by the positioning units 22, and next placing the reflector 12 on the waffle core 14.

This manufacturing technique ensures by means of mold M, that the desired shape is obtained on the external surface of the panel. However, this results in reflector 12 being flexed inside each of the cells 16, all the more as the size of these cells is larger. The presence of positioning units 32 between the partitions 18 provides further supporting areas which enable this flexion to be reduced very substantially, as illustrated in FIG. 2. The shape given to reflector 12 is also under better control, which ensures acceptable acoustic behavior for this reflector.

As it will now be described in detail by successively referring to FIGS. 2–9, the positioning units 22 may assume different shapes.

Figure 4:
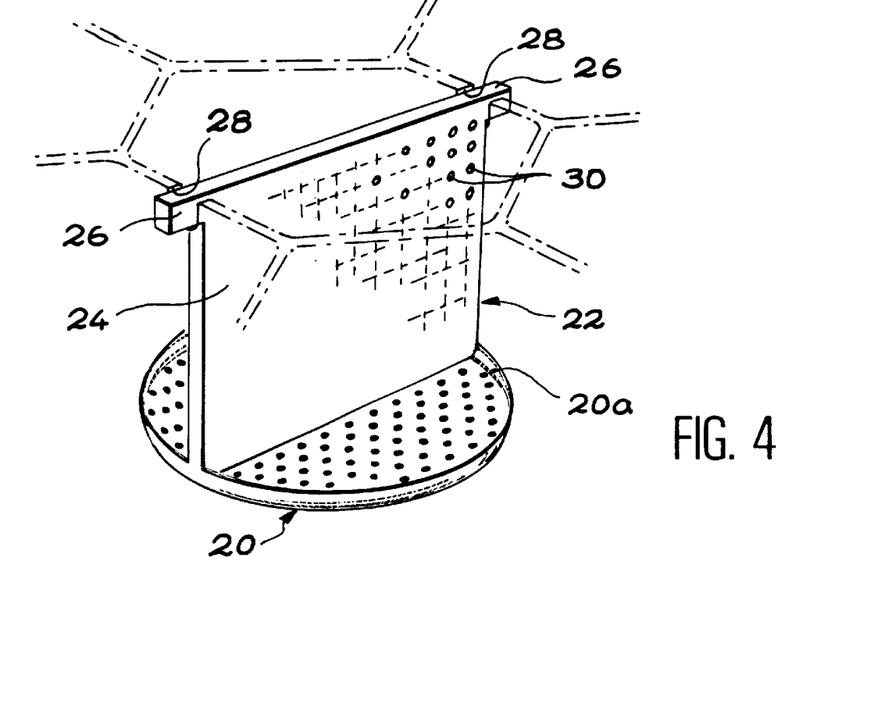
FIG. 4 is a perspective view of a separative component according to the first embodiment of the invention and of its associated positioning unit.

In a first embodiment of the invention illustrated in FIGS. 2 and 4, as well as in the right portion of FIG. 3, each positioning unit 22 supports one single separative component 20.

More precisely, each positioning unit 22 comprises in this case, a small plate 24 of substantially rectangular shape. The small plate 24 is located in a plane perpendicular to the one of the separative component 20 which it supports, and radially orientated with respect to the disk formed by this separative component in the illustrated embodiment. More specifically, in this case, each separative component 20 is fixed at one of the edges of the small plate 24, by welding for example.

The opposite edge of the small plate 24, forming the extreme portion of this small plate adjacent to reflector 12, is extended at each of its ends by a protruding portion 26, as shown in FIG. 4. These protruding portions 26 are provided in order to be received in machined notches 28 in the edge adjacent to the reflector 12 of both partitions 18 located, facing each other, in each of the cells 16. It should be noted that the notches are of a small size and do not impair the mechanical strength of the waffle core 14.

This layout enables each of the separative components to be positioned accurately, reliably and reproducibly, in one of cells 16 by taking as reference, the edges of the partitions 18 adjacent to the reflector 12.

With this layout, further supporting areas may also be defined for the reflector 12, in addition to the edges of the partitions 18 adjacent to the latter. Indeed, in each of the cells 16, the straight edge of the small plate 24 turned towards the reflector 12 forms a bridge which crosses this cell and forms a further supporting area for the reflector. As illustrated in the left portion of FIG. 2, the geometrical shape of the reflector 12 is thus better under control. Consequently, the noise reduction effect is very close to the expected theoretical effect, in spite of the recommended increase in the size of the cells 16.

Moreover, it should be noted that by increasing the size of the cells, the number of separative components 20 to be placed on a sandwich panel with determined dimensions, may be limited to an acceptable value. Furthermore, this increase in size in expressed by an increase in the flexibility of the partitions 18, which also contributes to facilitating the placing of these sets in the cells.

In order to limit the mass of the sandwich panel, the small plates 24 are preferably made lighter by perforations, windows, etc., as illustrated at 30 in FIG. 4.

Moreover, it should be noted that if the upper edge of the small plate 24 is preferably straight and continuous as illustrated in the figures, this edge should also have a different shape and include certain discontinuities, without departing from the scope of the invention.

Figure 5:
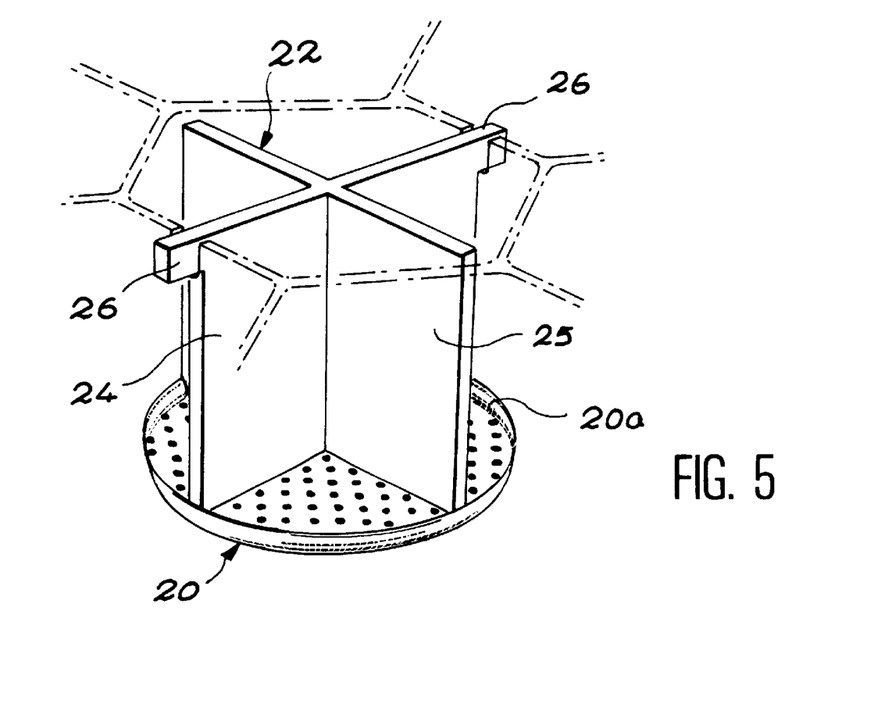
FIG. 5 is a perspective view comparable to FIG. 4, illustrating an alternative of the first embodiment of the invention.

In FIG. 5, as well as in the left portion of FIG. 3, an alternative of the first embodiment of the invention is illustrated.

This alternative differs from the embodiment which has just been described by the fact that instead of comprising only one small plate 24, each of the positioning units 22 consist of two small plates 24 and 25 forming a cross as seen from above. In other words, a small plate 25, orientated at right angles with respect to the small plate 24 as well as to the positioning unit 22, is associated which each of the sets to be placed within the cells 16 of the waffle core 14 of the panel.

In this alternative embodiment, the small plates 25 are free of any protruding portions. Indeed, the small plates 25 are normally orientated according to a diagonal of the hexagon sectionally formed by the cells 16, in which this set is received (FIGS. 3 and 5).

The alternative embodiment which has just been described in practice provides doubling of the further supporting areas to the benefit of reflector 12 in addition to the edges of partitions 18. Indeed, in each of the cells 16, the upper edges of the small plates 24 and 25 are flush with the reflector 12 and either form a further supporting area for the latter.

As earlier, the small plates 24 and 25 are preferably made lighter by the presence of perforations, windows, etc.

Figure 6:
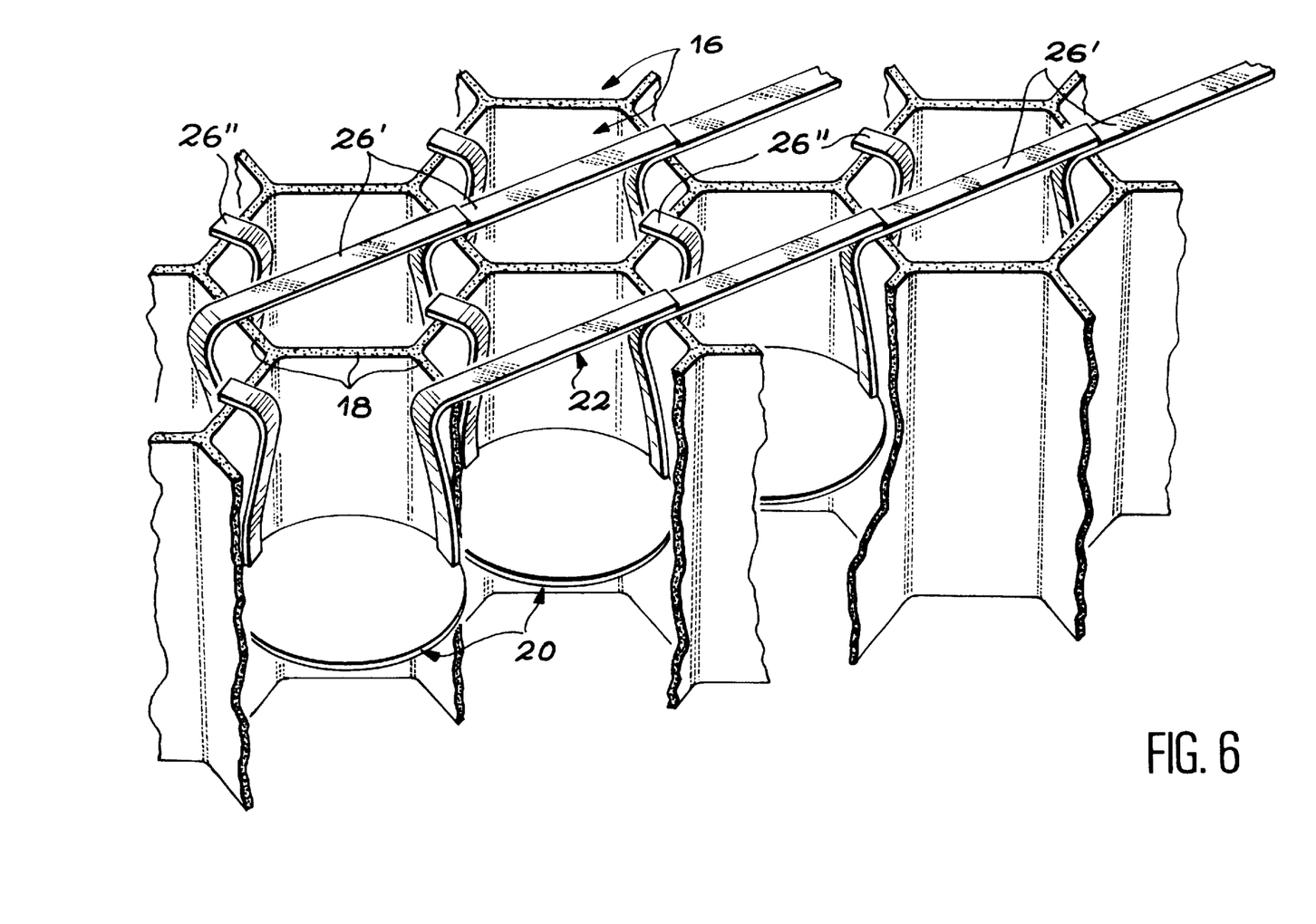
FIG. 6 is a perspective view illustrating another alternative of the first embodiment of the invention.

Another alternative to the first embodiment of the invention is illustrated in FIG. 6.

In this alternative embodiment, each of the positioning units 22 is individually supported in a cell 16 of the waffle core 14 of the panel by two tabs 26', 26". Each of these tabs comprises a folded end which extends into the joining plane between the waffle core 14 and the reflector 12. More specifically, at least one of these tabs (tab 26' in FIG. 6) completely crosses a cell 16 adjacent to the cell in which the separative component 20 is placed, supported by this tab. The tab 26' is supported on the edges of two partitions 18 facing said adjacent cell and extends in the joining plane as defined earlier. One of the ends of the tab 26' extends within the inside of the cell 16 in which the separative component 20 is placed, in order to support this separative component.

The positioning unit 22 associated with each separative component 20 comprises at least one other tab 26", which extends from the separative component 20 and is supported on the edge adjoining the reflector 12 of a partition 18 of the cell 16 in which the separative component is accommodated. More specifically, the tabs 26' and 26" are supported on different partitions 18 of the cell 16 receiving the separative component 20 bound to these tabs.

With the layout which has just been described, an accurate and reliable positioning of each of the separative components 20 with respect to the face of the waffle core 14 in which the reflector 12 is mounted, may be ensured. Moreover, the tabs 26' form bridges which cross the cells 16 in the joining plane between the waffle core 14 and the reflector 12. The tabs 26' thus define complementary supporting areas, for the reflector 12, which come and add to the supporting areas formed by the adjoining edges of the partitions 18. The acoustical properties of the panel may thus be maintained in spite of the use of a waffle core which has cells of relatively large dimensions.

A second embodiment of the invention will now be described, with reference to FIG. 7.

This second embodiment of the invention is mainly distinguished from the first embodiment described earlier with reference to FIGS. 4 and 4, by the fact that in this case, a same positioning unit 22 supports several separative components 20 inserted in aligned cells 16. More specifically, each positioning unit 22 in this case comprises a plurality of small plates 24 substantially located in a same plane and each bearing a separative component 20. Each positioning unit 22 further comprises a plurality of tabs 26, joining up the small plates 24, two by two, in the extension of the extreme portions of these small plates adjacent to reflector 12.

Because of this configuration, instead of having a length which is just sufficient for reaching a machined notch 28 and being supported by it in one of the partitions 18, each of the tabs 24 in this case crosses a cell 16 throughout its length, as well as two machined notches 28 in the edges adjacent to reflector 12 of both partitions 18 facing this cell.

In the layout which has just been described, each of the positioning units 22 therefore supports the separative components 20 located in every other cell 16 (one out of two) of a row of cells of the waffle core 14 of the panel. The other cells of this row are crossed by tabs 24 near the reflector 12.

Figure 7:
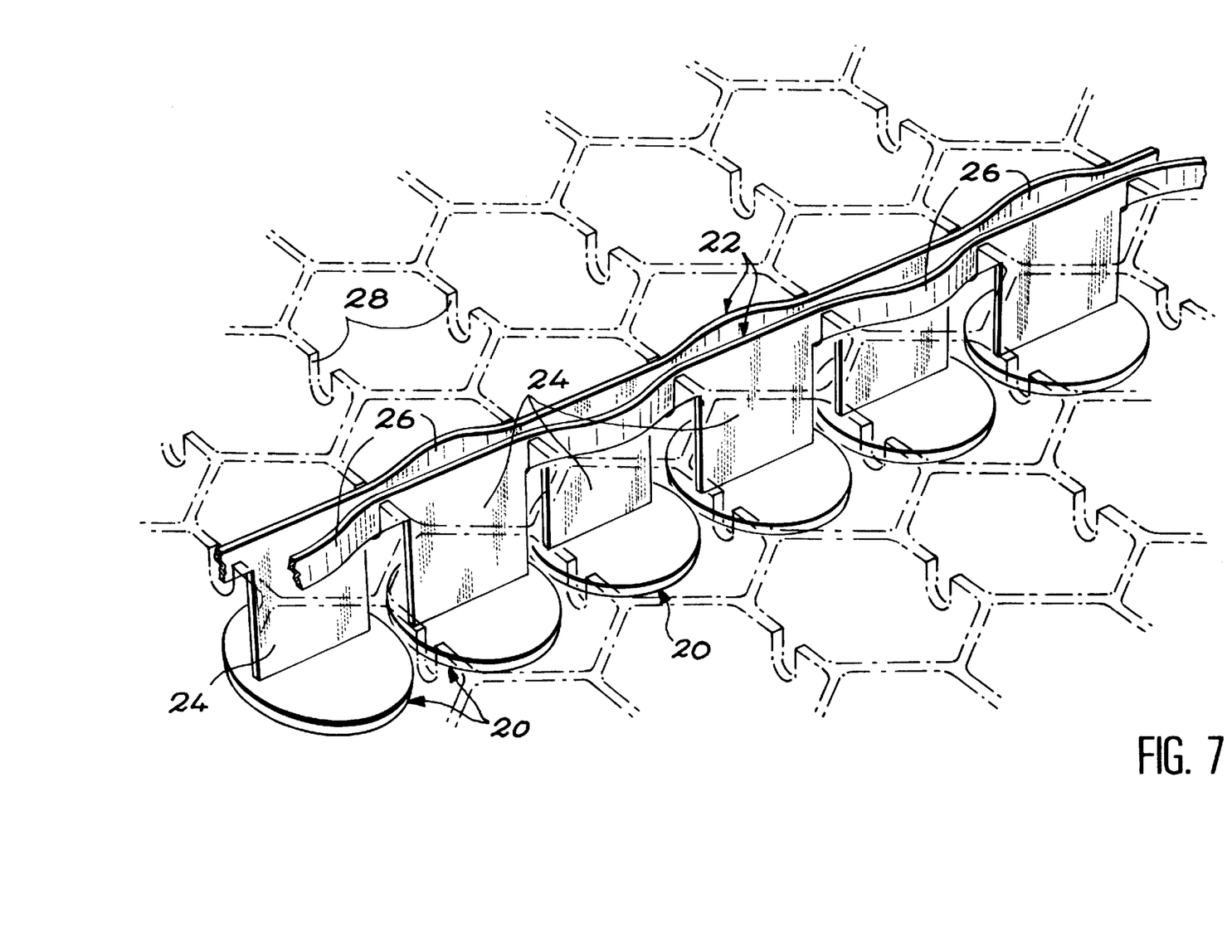
FIG. 7 is a perspective view comparable to FIG. 6, illustrating a second embodiment of the invention.

By adjoining to such a set, an identical set mounted in the same row of cells in order to be shifted by one cell with respect to the other set, as illustrated in FIG. 7, separative components 20 accurately positioned with respect to the face of the panel bearing the reflector 12 are easily and quickly mounted in each row of cells 16 of a sandwich panel. Moreover, the tabs 26 as well as the edges of the small plates 24 adjacent to reflector 12 define further supporting areas for the reflector in each of the cells.

As illustrated in FIG. 7, the tabs 26 are curved in their plane, so as to provide easy adjustment of the gap between the separative components 20, in order to take into account inevitable variations in the pitch of the cells 16 caused by tolerances in the manufacturing of the waffle core 14 and by its possible forming.

The embodiment of FIG. 7 has the same advantages as the embodiment and alternatives described earlier with references to FIGS. 2–6. Further, because each set placed in the cells 16 of the waffle core comprises several separative components 20, the number of parts to be placed is considerably reduced, which reduces in comparable proportions the manufacturing time for these panels.

Figure 8:
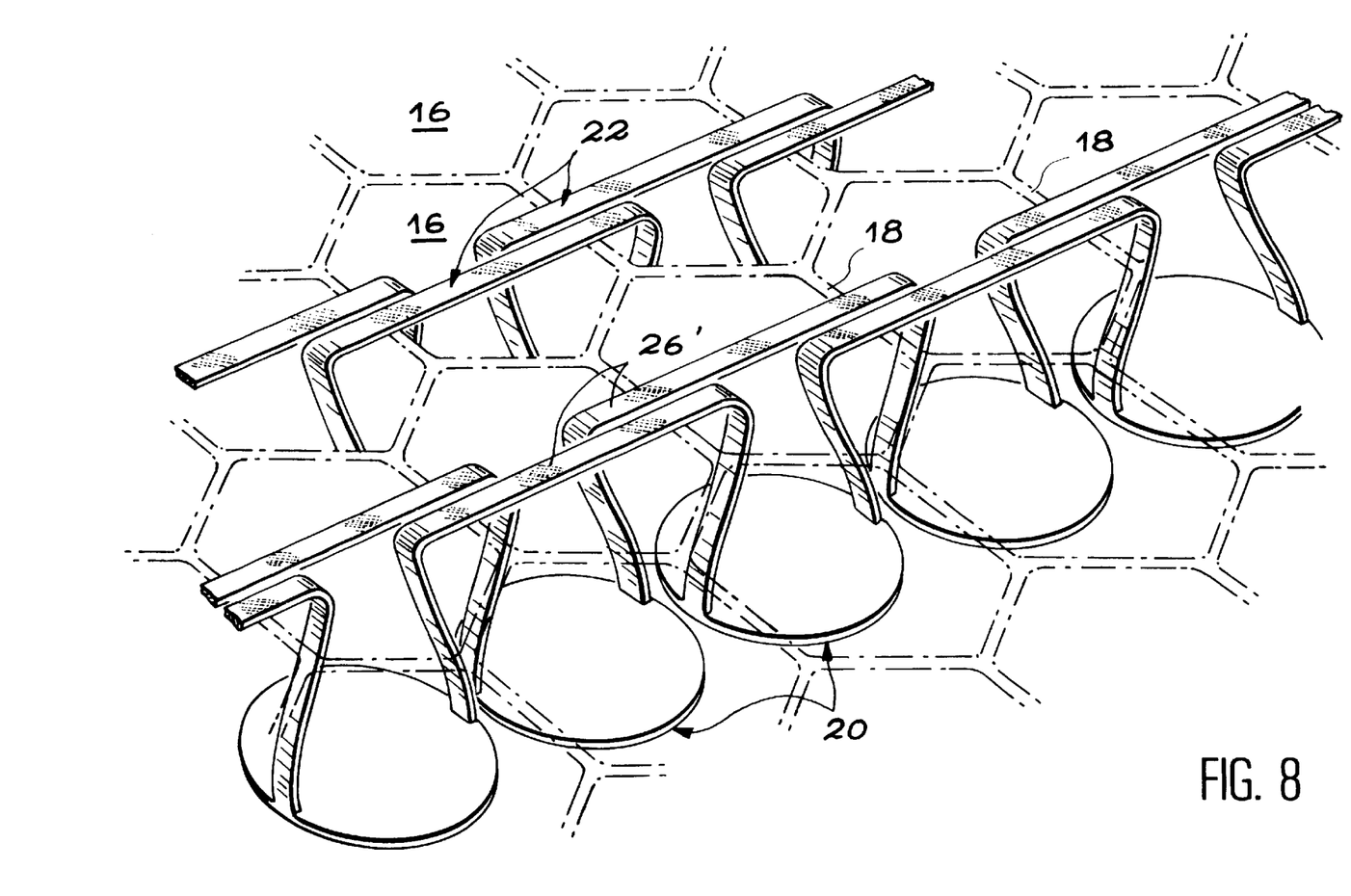
FIG. 8 is a perspective view comparable to FIG. 7, illustrating an alternative of the second embodiment of the invention.

An alternative of the second embodiment of the invention will now be described, with reference to FIG. 8.

As in the embodiment of FIG. 7, a same positioning unit 22 supports several separative components 20 placed in every other one (one out of two) of cells 16 of a row of cells of the waffle core 14. More specifically, in the thereby formed set, two consecutive separative components 20 are bound to one another by a tab 26' which crosses the cells 16 interposed between both cells in which the separative components 20 bound by this tab are received. For this purpose, each tab 26' includes a straight section which is supported on the edges adjoining the reflector 12 of both partitions 18 facing said intermediate cell. In other words, the straight section of the tabs 26' are placed in the joining plane which separates the waffle core 14 from the reflector 12.

The straight sections of tabs 26' have a length larger than the distance separating two opposite partitions 18 of the cells, i.e. larger than the width of the cells. Furthermore, each of tabs 26' includes two curved sections, which join up the ends of the straight sections to portions diametrically opposite to the external peripheral edges of the separative components 20.

This layout facilitates the placing of different components in the cells. Indeed, the pitch between the different separative components 20 of a same set, may be adjusted in order to take into account inevitable dimensional variations consecutive to tolerances in the manufacturing of the waffle core 14 and to its possible forming.

Figure 9:
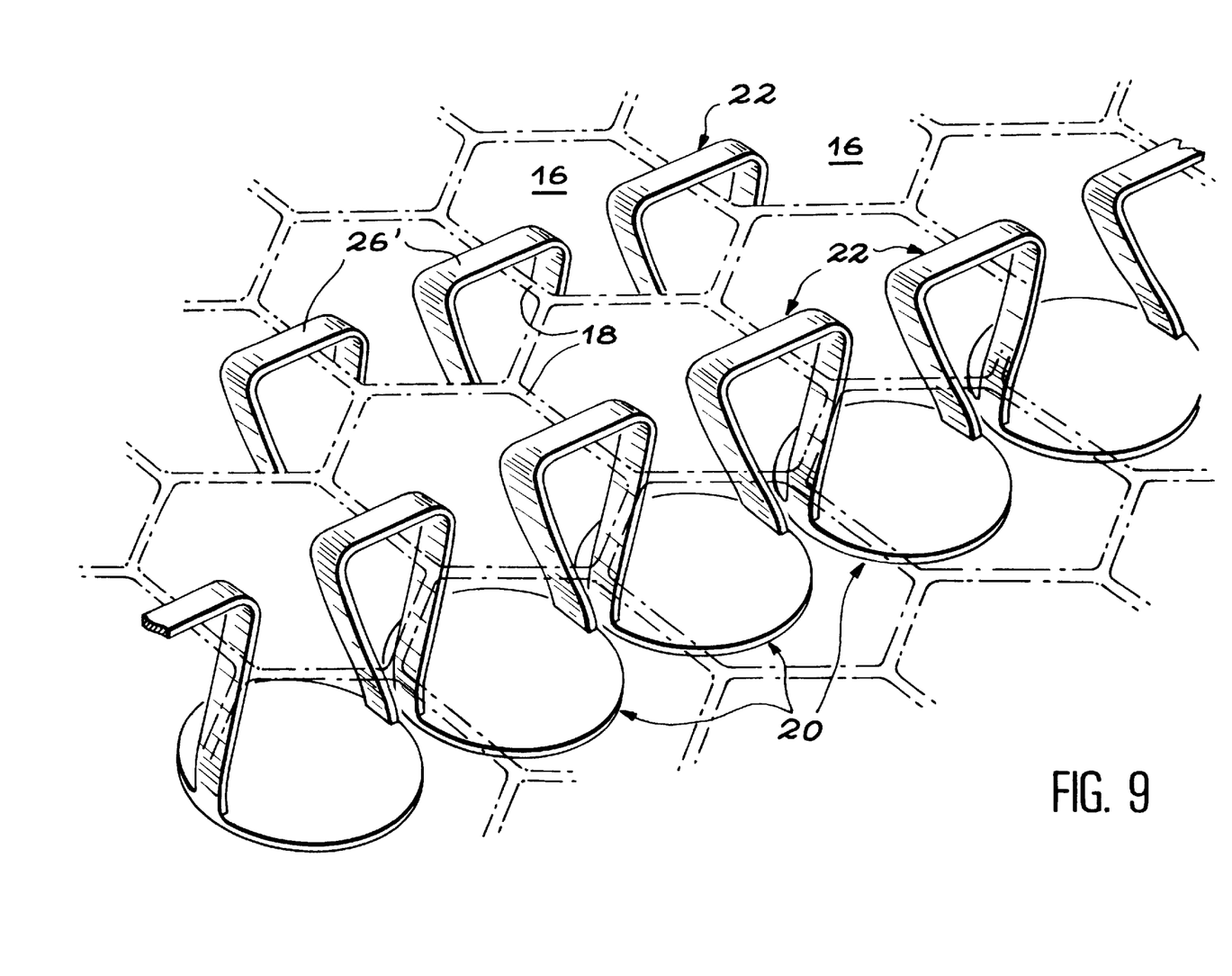
FIG. 9 is a perspective view comparable to FIGS. 7 and 8, illustrating another alternative of the second embodiment of the invention.

FIG. 9 illustrates another alternative to the second embodiment of the invention. In this case, a same positioning unit 22 supports separative components 20 placed in consecutive cells 16 of a same row of cells of the waffle core of the panel.

The positioning unit 22 then comprises tabs 26', each of which is supported on the edge turned towards the reflector 12 of a partition 18 separating two consecutive cells 16 of the considered cell row. This tab 26' comprises a straight section which overlaps the partition 18 and extends on both sides of the aforementioned edge, in the joining plane formed between the waffle core 14 and the reflector 12, up to the vicinity of the central portion of each of both relevant cells. Beyond these ends, each of the tabs 26' comprises two curved portions which extend into the inside of the corresponding cells 16 in order to come and support the separative components 20 received in these cells.

This alternative of the second embodiment of the invention has advantages comparable to those of the alternative described earlier with reference to FIG. 8.

Of course, the different embodiments and alternatives which have just been described are only examples, to which the present invention is not to be limited. In particular, when the positioning units support several separative components, they may assume any other shape allowing a relative displacement between these components in the direction defined by the row of cells in which they are received.

Moreover, in all the described embodiments, it is possible to inverse the resistive layer 10 and the reflector 12. The external peripheral edge 20a of each separative components 20 is then raised towards the resistive layer 10 and the positioning units 22 of the separative components 20 are supported on the edges of the partitions 18 adjacent to the resistive layer 10. The same applies to the protruding portions 26 and to tabs 26' and 26'', which may also be supported on the edges of the partitions 18 adjacent to the resistive layer 10.

What is claimed is:

1. A noise reduction sandwich panel, comprising:
   a resistive layer;
   a reflector;
   a unique waffle core, as a single piece, placed between the resistive layer and the reflector, and forming a plurality of juxtaposed cells, separated by partitions;
   separative components inserted in cells (16) in order to divide the latter in the direction of height, into at least two subcells;
   wherein each separative component has a substantially circular external peripheral edge and said panel further comprises positioning units for the separative components in the cells, said positioning units being secured to the separative components and supported on the edges of the partitions adjacent to the reflector or to the resistive layer.

2. The noise reduction sandwich panel according to claim 1, wherein the external peripheral edge (20a) of each separative component has a diameter substantially equal to the distance separating two opposite partitions of a cell.

3. The noise reduction sandwich panel according to claim 1, wherein the separative components (20) have the shape of substantially planar disks.

4. The noise reduction sandwich panel according to claim 3, wherein the external peripheral edge of each separative component is raised towards the reflector or towards the resistive layer.

5. The noise reduction sandwich panel according to claim 1, wherein each positioning unit supports only a single separative component.

6. The noise reduction sandwich panel according to claim 5, wherein each positioning unit comprises at least one small plate placed between the separative component which it supports and the reflector or the resistive layer, substantially perpendicularly to the latter, said small plate comprising two protruding portions, adjacent to the reflector or to the resistive layer, which are supported in notches formed in the edges adjacent to the reflector or to the resistive layer of two opposite partitions of the corresponding cell.

7. The noise reduction sandwich panel according to claim 5, wherein each positioning unit comprises at least two tabs which extend between the separative component which they support and the reflector or the resistive layer, each tab comprising a folded back end between the waffle core and the reflector or the resistive layer.

8. The noise reduction sandwich panel according to claim 7, wherein the folded back end of at least one of said tabs completely crosses a cell adjacent to the one which contains the separative component supported by this tab.

9. The noise reduction sandwich panel according to claim 1, wherein each positioning unit supports several separative components, inserted in cells aligned along a given direction, and integrates, between each pair of consecutive separative components which it supports, at least a tab able to deform along said direction.

10. The noise reduction sandwich panel according to claim 9, wherein the separative components supported by a same positioning unit are placed in one cell out of two, in said direction, each positioning unit comprising small plates, each of which is placed between the reflector or the resistive layer and one of the separative components supported by said positioning unit, perpendicularly to the reflector or to the resistive layer, a tab joining up each pair of consecutive small plates by overhanging a cell which does not contain any separative component supported by said positioning unit, said tab being curved with respect to said direction in order to be able to deform along this direction.

11. The noise reduction sandwich panel according to claim 9, wherein the separative components supported by a same positioning unit are placed in one cell out of two, each positioning unit comprising tabs which join up the consecutive separative components and a straight section of which overhangs a cell which does not contain any separative component supported by said positioning unit, said straight section having a length greater than the distance separating two opposite partitions of said cell, in order to allow the deformation of two curved sections of the tab joining up the straight section to the separative components contained in the neighboring cells.

12. The noise reduction sandwich panel according to claim 9, wherein separative components supported by a same positioning unit are placed in the adjacent cells, in said direction, each positioning unit (22) comprising tabs, a straight section of which overlaps the partitions separating the adjacent cells, on the reflector or the resistive layer side, so as to extend on both sides of said partitions, two curved sections of each tab joining up the straight section to the separative components contained in the adjacent cells.

* * * * *